United States Patent [19]
Gibbs

[11] Patent Number: 5,940,216
[45] Date of Patent: Aug. 17, 1999

[54] WINDOW TINTING APPARATUS

[76] Inventor: Kirk Gibbs, 312 Chase Common Dr., Norcross, Ga. 30071

[21] Appl. No.: 08/695,030

[22] Filed: Aug. 9, 1996

[51] Int. Cl.⁶ .......................... G02B 27/00; G02B 23/16; G02B 13/20; G02B 26/02

[52] U.S. Cl. .......................... 359/601; 359/610; 359/612; 359/230; 359/231; 359/886; 359/489; 359/493

[58] Field of Search .................................. 359/601, 610, 359/612, 230, 231, 886, 489, 493; 160/34, 107, 168.1 R, 115, 104

[56] References Cited

U.S. PATENT DOCUMENTS

| | | | |
|---|---|---|---|
| 4,443,063 | 4/1984 | Nishiyama | 350/334 |
| 4,654,626 | 3/1987 | Carsello | 338/172 |
| 4,696,547 | 9/1987 | Sims | 350/319 |
| 4,893,908 | 1/1990 | Dover et al. | 350/357 |
| 5,042,923 | 8/1991 | Diver et al. | 359/275 |
| 5,164,856 | 11/1992 | Zhang et al. | 359/489 |
| 5,197,242 | 3/1993 | Baughman | 52/171 |
| 5,390,045 | 2/1995 | Bernard | 359/275 |

*Primary Examiner*—Cassandra Spyrou
*Assistant Examiner*—Mohammad Y. Sikder

[57] ABSTRACT

The present invention relates to a window tinting apparatus (10) which comprises an outer window (16A) and an inner window (16B) having a window cavity (16C) there between. The window tinting apparatus (10) further comprises a first primary polarized panel (12A) securely affixed to the window (16A, 16B). The first primary polarized panel (12A) comprises a plurality of first primary polarized panel longitudinal polarization lines (12AA) therein. The window tinting apparatus (10) further comprises a secondary polarized panel (14) slidably mounted within the window cavity (16C). The secondary polarized panel (14) comprises a plurality of secondary polarized panel longitudinal polarization lines (14B). The secondary polarized panel (14) further comprises a secondary polarized panel ledge (14A) attached at a distal edge. The secondary polarized panel longitudinal polarization lines (14B) and the first primary polarized panel longitudinal polarization lines (12AA) are parallel to one another. The window tinting apparatus (10) further comprises a motor (18) which comprises a motor cam (18A) positioned adjacent to and contacting with the secondary polarized panel ledge (14A). When the at least one motor control panel ON/OFF switch (18CA) is primarily activated by a user, the motor (18) turns the motor cam (18A) to a pre-determined position where the secondary polarized panel longitudinal polarization lines (14B) and the first primary polarized panel longitudinal polarization lines (12AA) are parallel and overlaying or striping each other functioning as window tinting.

5 Claims, 4 Drawing Sheets

WINDOW TINTING APPARATUS

FIELD OF THE INVENTION

The present invention relates to window tinting apparatuses. More particularly, the present invention relates to window tinting apparatuses which comprise a first polarized panel and a movable second polarized panel functioning to make the tinting lighter or darker.

BACKGROUND OF THE INVENTION

Window tinting utilizing polarized plastic film is well known in the art. Typical uses are automobile windows, house windows and commercial building windows. However, the present invention utilizes a slidable secondary polarized panel having a plurality of secondary polarized panel longitudinal polarization lines therein, and a first primary polarized panel affixed to either an inner or outer surface of an outer window that or an inner window is novel and unique.

Numerous innovations for window tinting devices have been provided in the prior art that are described as follows. Even though these innovations may be suitable for the specific individual purposes to which they address, they differ from the present invention as hereinafter contrasted.

In U.S. Pat. No. 5,390,045, titled Adjustable Window Tinting System, invented by Leroy A. Bernard, Jr., a selectively variable window tinting system for limiting a passage of both visible light and radiative heat through an automobile window. Embodiments of the system include window glass assemblies which utilizes photochromatic glass, electrochromatic glass, and a pair of spaced glass panes fillable with a tinted fluid. The latter embodiment also utilizes a plurality of differently tinted fluids which may be selectively injected between the glass panes to provide various amounts of tinting therein.

In U.S. Pat. No. 5,197,242, titled Dual-pane thermal window with liquid crystal shade, invented by Ray H. Baughman, Ernest D. Buff, Helmut Eckhardt, and Gerhard H. Fuchs, there is disclosed a dual-pane thermal window unit comprises two non-intersecting or, preferably, substantially parallel, spaced window panes, mounted in a window frame, a first of the panes having affixed thereto a first wall of an electro-optical liquid crystal cell providing a selected light transmittance, and a second of said panes delimiting, with a second wall of said cell, and a space providing a thermal break. Each of the first and second walls comprises an electrically conductive film composed of plastic and having sufficient supporting strength to maintain the structural integrity of the cell. The window is light weight, economical to manufacture and efficient and reliable in operation.

In U.S. Pat. No. 5,042,923, titled Adjustable Tint Window with Electrochromic Conductive Polymer, invented by James F. Wolf, Granville G. Miller, Lawrence W. Shacklette, Ronald L. Elsenbaumer, and Ray H. Baughman, there is taught a method for decreasing radiative heat transfer and glare through a window. The method comprises the steps of: (a) mounting within a frame of the window a plurality of spaced window panes, a first and second of the panes having opposing faces; (b) assembling between the opposing faces a conductive polymer cell, the cell having a first wall composed of a transparent conductive layer affixed to the first pane and having deposited thereupon an electroactive electro-optically responsive conductive polymer, and a second wall comprised of a transparent conductive layer coated on the second pane, the layer being optionally coated with a second electro-optically responsive polymer, the first and second walls delimiting a cavity containing an ion-conducting electrolyte which contacts opposing surfaces of the first and second walls, and (c) applying a potential between the first and second walls to provide a selected light transmittance upon passage of current therebetween.

In U.S. Pat. No. 4,893,908, titled Adjustable Tint Window with Electrochromic Conductive Polymer, invented by James F. Wolf, Granville G. Miller, Lawrence W. Shacklette, Ronald L. Eisenbaumer, and Ray H. Baughman, there is disclosed a method for decreasing radiative heat transfer and adjustably limiting visible light and near infrared radiation transfer and glare through a window. The method comprises the steps of: (1) mounting within a frame of the window a plurality of spaced window panes, a first and second of the panes having opposing faces: (b) assembling between the opposing faces a conductive polymer cell, the cell having a first wall composed of a transparent conductive layer affixed to the first pane and having deposited thereupon an electroactive electro-optically responsive conductive polymer, and a second wall comprised of a transparent conductive layer coated on the second pane, the layer being optionally coated with a second electro-optically responsive polymer, the first and second walls delimiting a cavity containing an ion-conducting electrolyte which contacts opposing surfaces of the first and second walls, and (c) applying a potential between the first and second walls to provide a selected light transmittance upon passage of current therebetween.

In U.S. Pat. No. 4,696,547, titled Window for Shielded Enclosure, invented by Richard E. Sims, a window for an electromagnetic interference shielded enclosure is disclosed, which includes a frame defining a window aperture, a pair of spaced apart, light transmitting, fluid impervious panels supported by the frame and a cover for the aperture. In the region enclosed by the frame and the pair of panels, a quantity of light transmitting and electrically conductive fluid is captured. The fluid is electrically connected through the frame to the shield of an enclosure to provide an optically transparent window while maintaining the integrity of the shield.

In U.S. Pat. No. 4,443,063, invented by Mitsuru Nishlyama, there is disclosed a display cell comprising two substrates for forming in combination a compartment, an injection hole formed in one of them, a pathway provided for connecting the compartment and the injection hole, and a concavity shaped in at least one of the two substrates. The concavity assures that the pathway has a predetermined width by the depth of the concavity in order that the pathway conducts a liquid to the compartment. Preferably, the depth of the concavity is in the order of about 10 to 100 um.

The above described patent inventions differ from the present invention because they lack a first primary polarized panel having a plurality of first primary polarized panel longitudinal polarization lines and a secondary polarized panel having a plurality of secondary polarized panel longitudinal polarization lines wherein the secondary polarized panel is slidably insertable into the first primary polarized panel which varies tinting of a window.

Numerous innovations for window tinting have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to window tinting apparatuses. More particularly, the present invention relates to window tinting apparatuses which comprise a first polarized panel and a movable second polarized panel which the striping (polarization) in comparison to one another is varied, thereby functioning to make the window tinting lighter or darker.

The types of problems encountered in the prior art are plastic polarized film window tinting is non-variable which is a detriment and/or dangerous in certain lighting conditions.

In the prior art, unsuccessful attempts to solve this problem were attempted namely: electronic window tinting means. However, the problem was solved by the present invention because it utilizes a first primary polarized panel and a secondary polarized panel which striping and concurrently tinting can be varied.

Innovations within the prior art are rapidly being exploited in the field of window tinting.

The present invention went contrary to the teaching of the art which teaches electrical window tinting means.

The present invention solved a long felt need for a simple inexpensive window tinting means which utilizes commonly available polarized window tinting film.

The present invention produced unexpected results namely: heat loss during winter months could be minimized and air conditioning in the summer months in a building by utilizing the apparatus hereof could be maximized.

Accordingly, it is an object of the present invention to provide a window tinting apparatus.

More particularly, it is an object of the present invention to provide a window tinting apparatus which comprises a first primary polarized panel having first primary polarized panel longitudinal polarization lines incorporated therein and/or thereon.

In keeping with these objects, and with others which will become apparent hereinafter, one feature of the present invention resides, briefly stated, in the window tinting apparatus comprising an optional first secondary polarized panel (12B) having first secondary polarized panel longitudinal polarization lines (12BA) incorporated therein and/or thereon.

When the window tinting apparatus is designed in accordance with the present invention, the secondary polarized panel comprises secondary polarized panel longitudinal polarization lines incorporated therein and/or thereon and further comprises a secondary polarized panel ledge securely attached along a distal edge.

In accordance with another feature of the present invention, first primary polarized panel and/or the first secondary polarized panel can be affixed to an outer window inner surface or an outer window outer surface of an outer window and/or affixed to an inner window inner surface and/or an inner window outer surface or an inner window.

Another feature of the present invention is that the inner window and the outer window have a window cavity there between within which the secondary polarized panel is slidably mounted.

Yet another feature of the present invention is that the window tinting apparatus further comprises a motor.

Still another feature of the present invention is that the motor comprises a motor cam attached thereto.

Yet still another feature of the present invention is that the motor may optionally comprise a motor relay electrically connected thereto.

Still yet another feature of the present invention is that the motor further comprises a motor control panel electrically connected between a power source and the motor.

Another feature of the present invention is that the power source can be a battery, DC power or AC power.

Yet another feature of the present invention is that the motor control panel comprises a motor control panel ON/OFF switch electrically connected between the power source and the motor.

Still another feature of the present invention is that the motor control panel may optionally further comprise a motor control panel dimmer electrically connected between the motor control panel ON/OFF switch and the motor.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—window tinting apparatus (10)
12A—first primary polarized panel (12A)
12AA—first primary polarized panel longitudinal polarization lines (12AA)
12B—first secondary polarized panel (12B)
12BA—first secondary polarized panel longitudinal polarization lines (12BA)
14—secondary polarized panel (14)
14A—secondary polarized panel ledge (14A)
14B—secondary polarized panel longitudinal polarization lines (14B)
16A—outer window (16A)
16AB—outer window outer surface (16AB)
16B—inner window (16B)
16BA—inner window inner surface (16BA)
16BB—inner window outer surface (16BB)
16C—window cavity (16C)
18—motor (18)
18A—motor cam (18A)
18B—motor relay (18B)
18C—motor control panel (18C)
18CA—motor control panel ON/OFF switch (18CA)
8CB—motor control panel dimmer (18CB)

DETAILED DESCRIPTION OF THE PREFERRED EMBODIMENT

Figure 1:
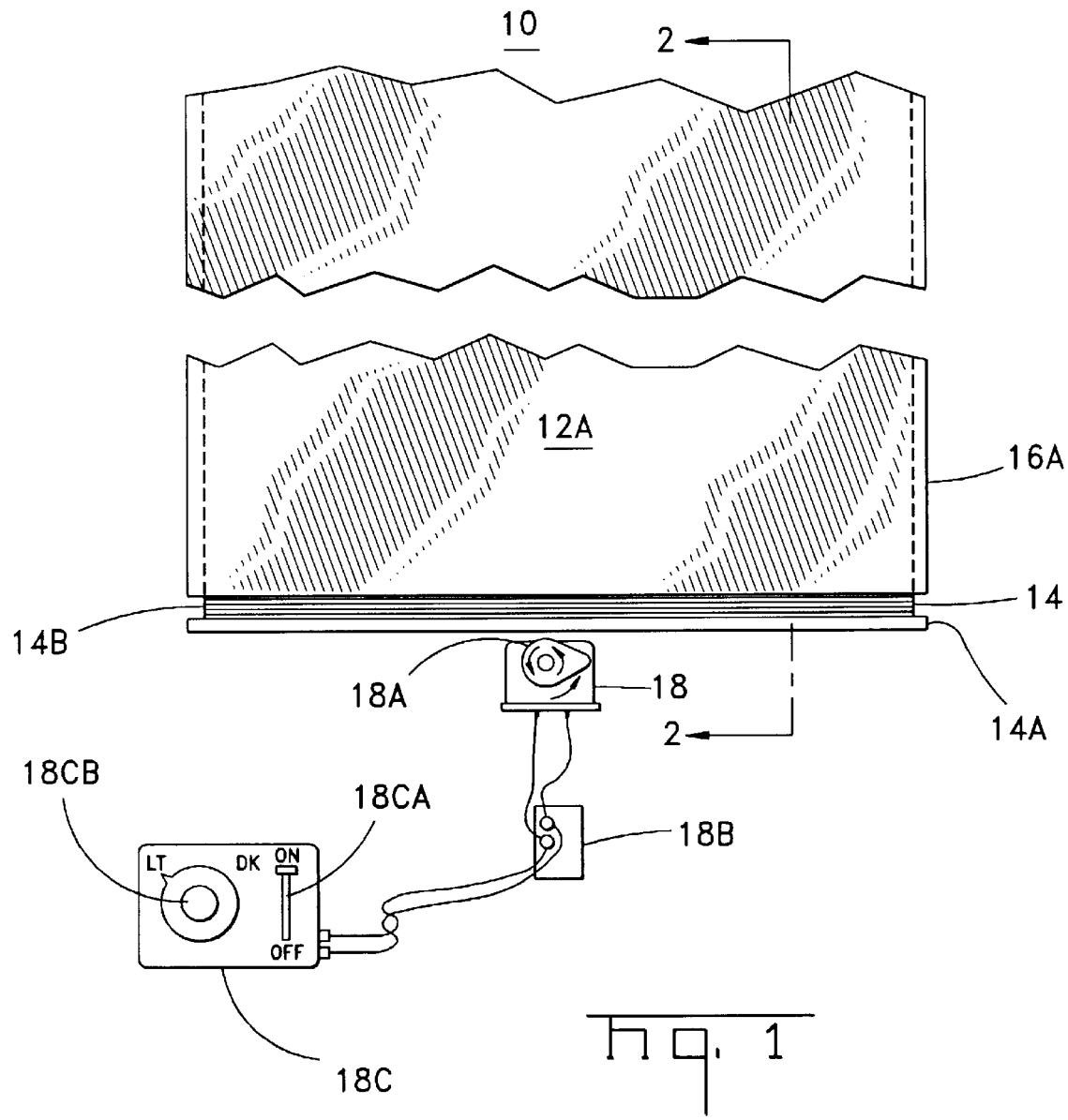
FIG. 1 is a partial front view of a window tinting apparatus according to this invention, where such apparatus exhibits a secondary polarized panel having a ledge contacting a motor attached to a rotating cam which slidably inserts and pulls said panel therefrom, and which is variably regulated by a motor control panel.
Figure 2:
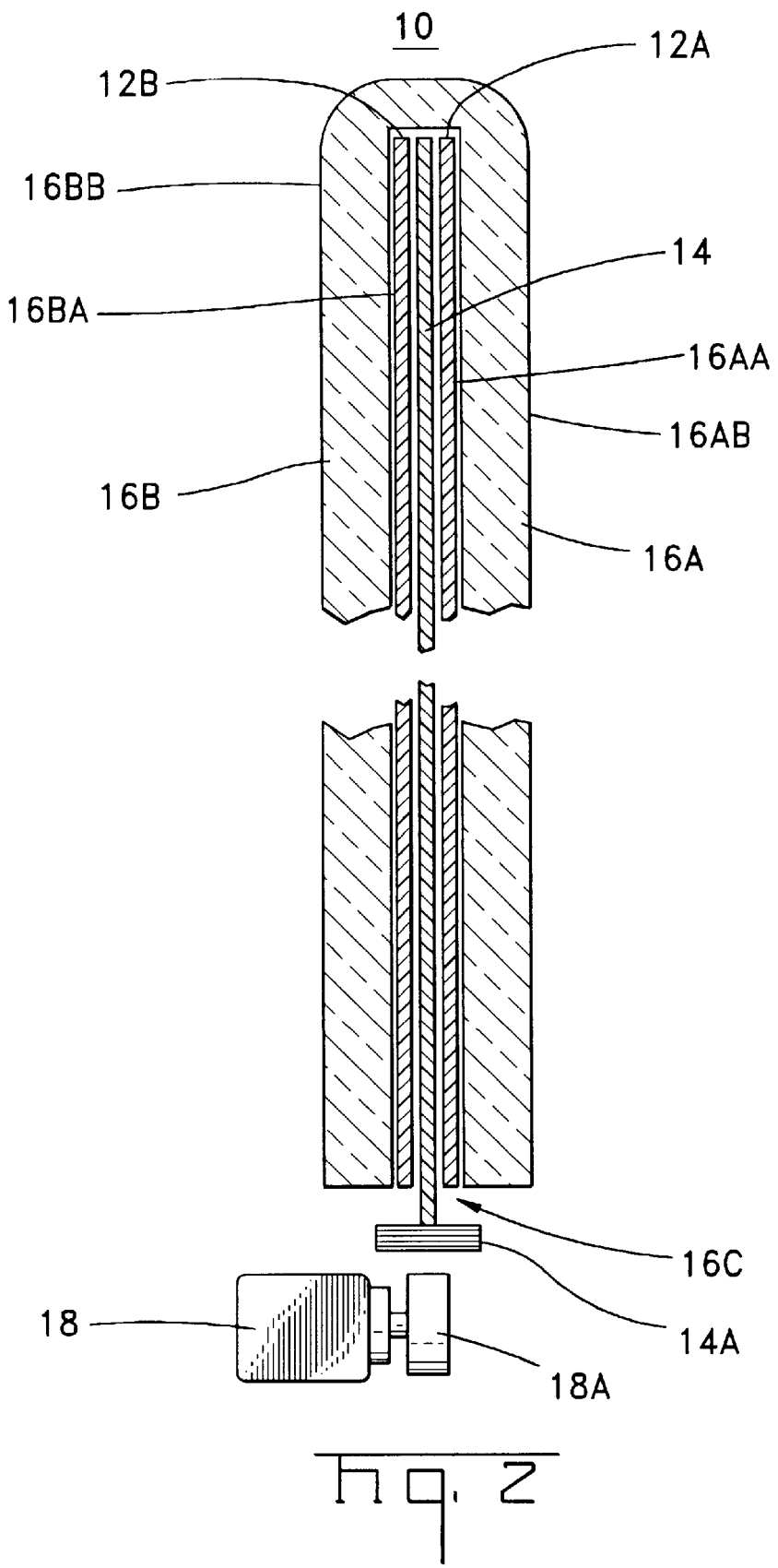
FIG. 2 is a cross-sectional view of a window tinting apparatus taken along line 2—2 of FIG. 1.
Figure 3:
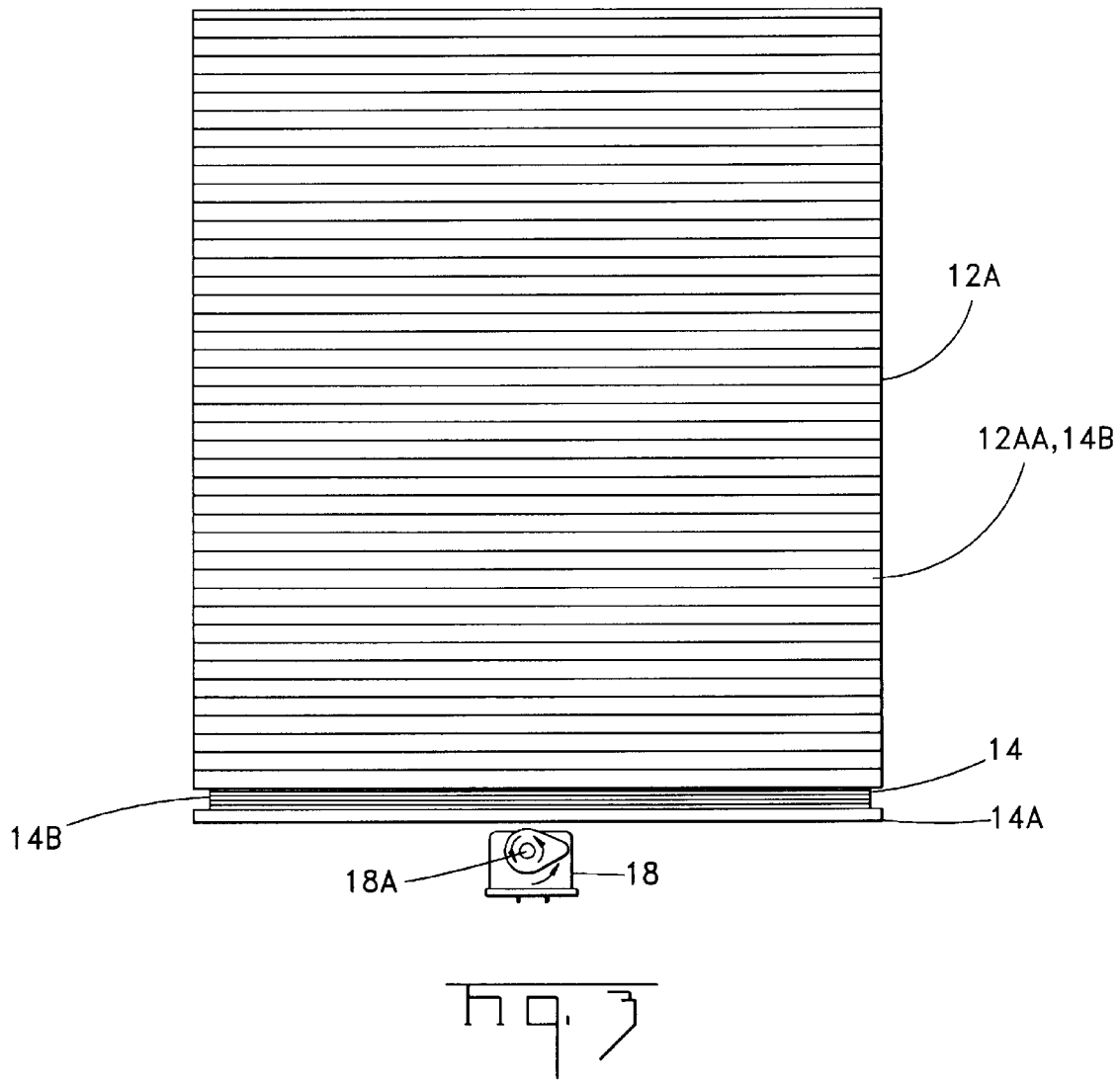
FIG. 3 is a front view of a window tinting apparatus hereof exhibiting a secondary polarized panel in an overlay position (minimizing window tinting) with a first primary polarized panel.
Figure 4:
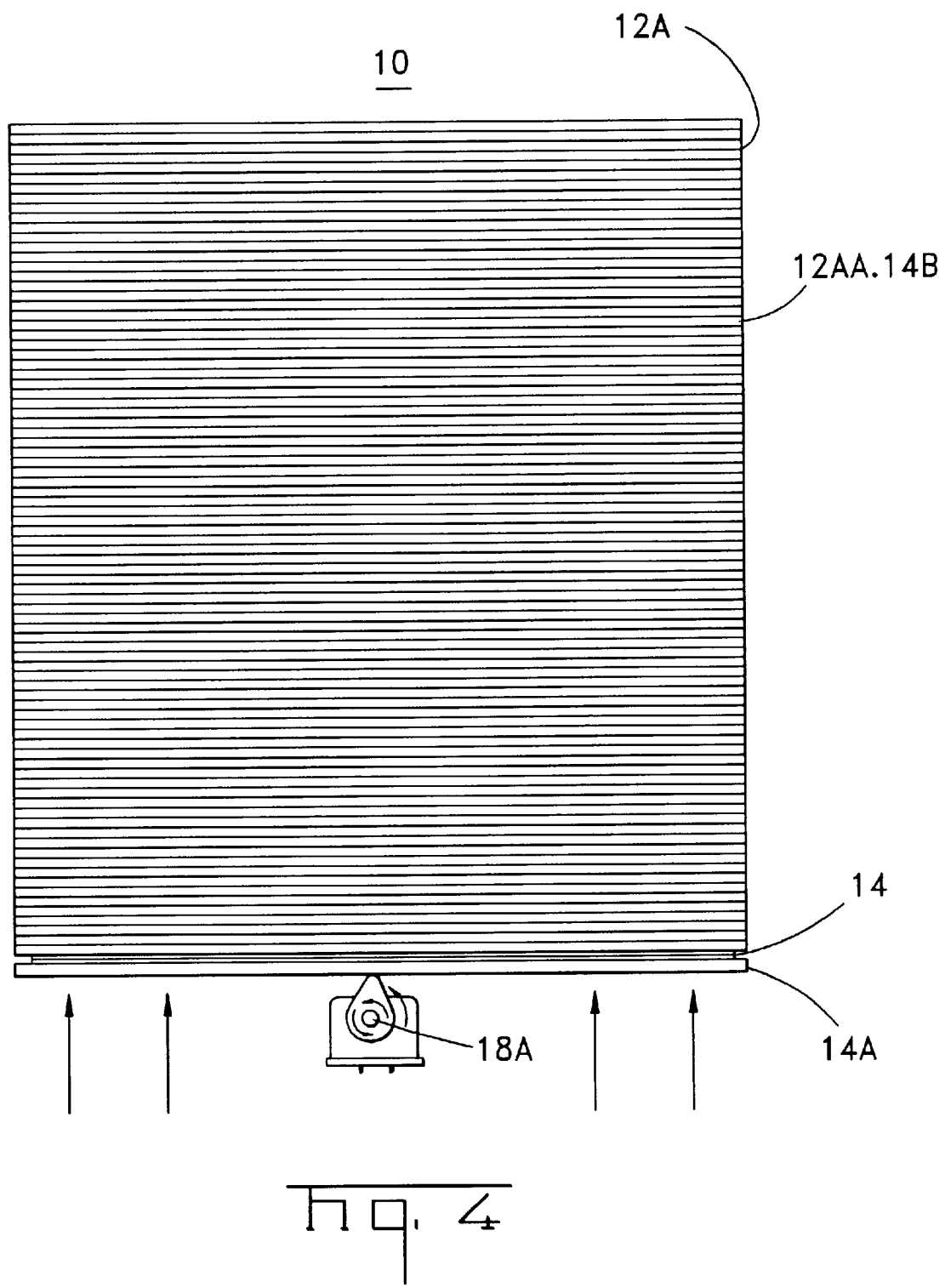
FIG. 4 is a front view of a window tinting apparatus of this invention exhibiting a secondary polarized panel in a striping position (maximizing window tinting) with a first primary polarized panel.

Turning now to the several FIGURES, there is disclosed a window tinting apparatus (10) comprising an outer window (16A) and an inner window (16B) having a window cavity (16C) therebetween. The outer window (16B) comprises an outer window inner surface (16AA) and an outer window outer surface (16AB). The inner window (16B) comprises an inner window inner surface (16BA) and an inner window outer surface (16BB).

The window tinting apparatus (10) further comprises a first primary polarized panel (12A) securely affixed to the window (16A,16B). The first primary polarized panel (12A) comprises a plurality of first primary polarized panel longitudinal polarization lines (12AA) therein. The window tinting apparatus (10) may optionally comprise a first secondary polarized panel (12B) having a plurality of first secondary polarized panel longitudinal polarization lines (12BA). The first primary polarized panel (12A) and the first secondary polarized panel (12B) are a plastic film.

The window tinting apparatus (10) further comprises a secondary polarized panel (14) slidably mounted within the window cavity (16C). The secondary polarized panel (14) comprises a plurality of secondary polarized panel longitudinal polarization lines (14B). The secondary polarized panel (14) further comprises a secondary polarized panel ledge (14A) attached at a distal edge. The secondary polarized panel ledge (14A) functions as a surface for the motor cam (18A) to rotationally push upon. The secondary polarized panel ledge (14A) is parallel to longitudinal polarization lines on the secondary polarized panel (14). The secondary polarized panel longitudinal polarization lines (14B) and the first primary polarized panel longitudinal polarization lines (12AA) are parallel to one another. The secondary polarized panel (14), the outer window (16A), and the inner window (16B) are constructed from a group of materials consisting of glass, plastic, and plastic composites.

The window tinting apparatus (10) further comprises a motor (18) which comprises a motor cam (18A) positioned adjacent to and contacting with the secondary polarized panel ledge (14A). The motor (18) further comprises a motor control panel (18C) having at least one motor control panel ON/OFF switch (18CA) electronically connected between the motor (18) and a power means. When the at least one motor control panel ON/OFF switch (18CA) is primarily activated by a user, the motor (18) turns the motor cam (18A) to a pre-determined position where the secondary polarized panel longitudinal polarization lines (14B) and the first primary polarized panel longitudinal polarization lines (12AA) are parallel and overlaying each other functioning as a minimal window tinting. When the at least one motor control panel ON/OFF switch (18CA) is secondarily activated by a user, the motor (18) turns the motor cam (18A) to a pre-determined position where the secondary polarized panel longitudinal polarization lines (14B) and the first primary polarized panel longitudinal polarization lines (12AA) are parallel and striping each other functioning as a maximum window tinting. The motor (18) further comprises a motor relay (18B) electrically connected between the motor control panel (18C) and the motor (18). The motor control panel (18C) further comprises a motor control panel dimmer (18CB) which functions to regulate the amount of striping of the first primary polarized panel longitudinal polarization lines (12AA) and the first secondary polarized panel longitudinal polarization lines (12BA), thus, varying tinting accordingly.

The window tinting apparatus (10) further comprises a first secondary polarized panel (12B) securely affixed to the window (16A,16B), the first secondary polarized panel (12B) comprises a plurality of first secondary polarized panel longitudinal polarization lines (12BA) therein. The plurality of first secondary polarized panel longitudinal polarization lines (12BA) and the first primary polarized panel longitudinal polarization lines (12AA) are in a partial strip position to each other.

It will be understood that each of the elements described above, or two or more together, may also find a useful application in other types of constructions differing from the type described above.

While the invention has been illustrated and described as embodied in a window tinting apparatus, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A window tinting apparatus comprising an integral window assembly comprising;
    a) first and second spaced-apart transparent window panels joined together along one common edge, and a limited narrow space therebetween, accessible between complementary second edges of said window panels;
    b) at least a first polarized panel affixed to said apparatus within said narrow space, where said first polarized panel includes a set of spaced-apart, longitudinally disposed polarization lines;
    c) a second polarized panel slidably mounted within said narrow space, where said second polarized panel includes a set of spaced-apart, longitudinally disposed polarization lines which are parallel to said set of polarization lines of said first polarized panel;
    d) a ledge mounted to said second polarized panel and exposed at said second edges; and
    e) a motor in close proximity to said ledge and operable to raise and lower said second polarized panel, where a first operable position is to longitudinally align the respective sets of polarization lines of said first and second polarized panels for minimal window tinting, and a second operable position to align the polarization lines of one said set with the space between the polarization lines of said other set for maximum window tinting.

2. The window tinting apparatus according to claim 1, including a second fixed polarized panel within said narrow space, said second fixed polarized panel having a set of spaced-apart, longitudinally disposed polarization lines vertically displaced from the polarization lines of said first set.

3. The window tinting apparatus according to claim 1, including a motor and cam operable to raise and lower said ledge.

4. The window tinting apparatus according to claim 3, including a control panel to activate said motor, and a dimmer to set the desired window tinting.

5. The window tinting apparatus according to claim 1, wherein said fixed polarized panels are plastic film secured to the respective inner walls of said window panels.

* * * * *